US012688543B1

(12) United States Patent
Fox

(10) Patent No.: US 12,688,543 B1
(45) Date of Patent: Jul. 21, 2026

(54) SYSTEMS AND METHODS FOR DEEPFAKE-RESISTANT DATA AUTHENTICATION

(71) Applicant: NuCo Vault, LLC, Tarpon Springs, FL (US)

(72) Inventor: Mariah Fox, Tarpon Springs, FL (US)

(73) Assignee: NUCO VAULT, LLC, Tarpon Springs, FL (US)

( * ) Notice: Subject to any disclaimer, the term of this patent is extended or adjusted under 35 U.S.C. 154(b) by 0 days.

(21) Appl. No.: 19/341,102

(22) Filed: Sep. 26, 2025

Related U.S. Application Data

(60) Provisional application No. 63/822,425, filed on Jun. 12, 2025.

(51) Int. Cl.
 *G06T 1/00* (2006.01)
(52) U.S. Cl.
 CPC ...... *G06T 1/005* (2013.01); *G06T 2201/0065* (2013.01)
(58) Field of Classification Search
 CPC ............ G06T 1/005; G06T 2201/0065; G06T 1/0021; G06Q 20/3829; G06Q 30/0185; G06Q 10/0875; G06Q 50/184; G06Q 20/38215; G06Q 20/123; G06Q 30/018; G06Q 20/3672; G06F 21/10; G06F 21/44; G06F 21/6218; G06F 21/6245; G06F 21/31; G06F 21/602; G06F 21/16; G06F 21/64; H04L 63/1408
 USPC .......................................................... 382/100
 See application file for complete search history.

(56) References Cited

U.S. PATENT DOCUMENTS

| | | | | |
|---|---|---|---|---|
| 2002/0184502 A1* | 12/2002 | Sall et al. | ................. | H04L 9/00 713/176 |
| 2005/0144456 A1* | 6/2005 | Acharya et al. | .......... | H04L 9/00 713/176 |
| 2025/0103737 A1* | 3/2025 | Shea et al. | .......... | G06F 21/6218 |
| 2025/0272361 A1* | 8/2025 | Horton et al. | ........ | G06F 21/106 |

FOREIGN PATENT DOCUMENTS

CN          118741266 A  * 10/2024 ......... H04N 21/8358

* cited by examiner

*Primary Examiner* — Matthew C Bella
*Assistant Examiner* — Daniel Joseph Santos
(74) *Attorney, Agent, or Firm* — Nicholas Martin; Greenberg Traurig, LLP

(57) ABSTRACT

Disclosed herein is a quantum-based, deepfake resistant data authentication framework that provides read/write protections for electronic and/or digital content through quantum-based entanglement and steganographic techniques. In some implementations, the framework can identify who owns a digital asset to facilitate identification of digital content as being deepfake content and the takedown of the deepfake content. In some implementations, the framework can embed a watermark into the digital asset based on quantum principles, bind the watermark with physical properties of the digital asset, and entangle the embedded watermark (or qbit) with an entanglement bit (ebit) that is stored off-chain. In some implementations, the framework can introduce Gibbs artifacts into the digital asset as secondary identifiers. In some implementations, the framework can authenticate the digital asset based on the embedded watermark and/or the Gibbs artifacts subsequent to the digital asset being subjected to AI- and deepfake-based manipulations.

18 Claims, 7 Drawing Sheets

300

302 — Receive digital asset

304 — Analyze digital asset

306 — Generate watermark

308 — Encode and bind watermark to physical constraints of digital asset

310 — Encode artifacts into digital asset

312 — Generate entangled ebit

314 — Validate resilience to deepfake AI models

400

402 — Collect digital asset

404 — Analyze digital asset

406 — Collect entangled ebit from storage

408 — Extract values from digital asset

410 — Generate authentication tag(s)

412 — Authenticate digital asset

414 — Control data transfer of digital asset

SYSTEMS AND METHODS FOR DEEPFAKE-RESISTANT DATA AUTHENTICATION

FIELD OF THE DISCLOSURE

This application claims the benefit of and priority from U.S. Provisional Application No. 63/822,425, filed Jun. 12, 2025, whereby the contents of which are incorporated by reference in its entirety.

FIELD OF THE DISCLOSURE

The present disclosure relates to a deepfake-resistant data authentication system and method, and more particularly, to a computerized, deepfake-resistant data authentication framework for secure ownership identification and tamper detection for electronic and/or digital content that has been processed by deepfake artificial intelligence (AI) model(s).

SUMMARY OF THE DISCLOSURE

According to some embodiments, as discussed herein, the disclosed systems and methods provide a quantum-based, deepfake-resistant data authentication framework that provides digital content and intellectual property protection through quantum-inspired, frequency-based identifier encoding techniques that enable tracking and authentication of digital content even after the digital content has been subjected to processing by deepfake AI model(s) (e.g., generative adversarial networks (GANs), diffusion models, foundation models, and the like). According to some embodiments, as discussed herein, reference to "intellectual property protection" should be understood as the security, protection and/or digital rights management, or otherwise, read/write/access, for electronic and/or digital content or assets, which can include, but is not limited to, files, objects, items, network resources, network locations, data structures, applications, and the like, or some combination thereof. For example, such content/assets can include, but are not limited to, audio files, video files, image files, documents, multimedia files, real simple syndication (RSS) files, and the like, or some combination thereof.

In some embodiments, the deepfake-resistant framework embeds resilient frequency-based identifiers in the mid-frequency domain of digital assets (e.g., by using wavelet transformations, the Discrete Cosine Transform (DCT), the Fast Fourier Transform (FFT), the Short-Time Fourier Transform (STFT), and/or the Hilbert Transform). In some embodiments, these frequency-based identifiers or signatures are embedded across, for example, visual frame sequences, audio spectrograms, and temporal data flows. In some embodiments, these embedded frequency-based identifiers can comprise a watermark payload (e.g., a compressed hash) including a tokenized, unique digital fingerprint that is embedded into mid-frequency coefficients of the digital asset.

In some embodiments, the framework can implement quantum-inspired entanglement by entangling quantum-inspired bits (qubits or qbits, used interchangeably) of digital assets, such as the embedded frequency-based identifiers (or watermarks), with entanglement bits (ebits) that are stored off-chain thereby enabling, for example, tamper detection (e.g., by determining whether the embedded frequency-based identifiers/watermarks are altered or artificially regenerated), decentralized identity validation even after generative transformations, and post-distribution ownership enforcement across uncontrolled ecosystems.

Additionally, in some embodiments, the deepfake-resistant framework can introduce controlled, detectable artifacts (e.g., Gibbs phenomenon-based artifacts) into the digital asset. Generally, Gibbs artifacts are avoided in conventional systems because they are associated with degraded perceptual quality, for example. In contrast, in some embodiments, the disclosed framework intentionally introduces Gibbs artifacts as part of the watermark embedding process such that the artifacts are distinct and detectable by the framework during validation/authentication, but also subtle enough not to affect user experience.

For example, in some embodiments, the framework introduces controlled discontinuities or sharp transitions by deliberately creating abrupt changes in pixel values, frequency coefficients, and/or amplitude/phase at specific locations or boundaries within the digital asset. In some embodiments, these changes are engineered to produce subtle Gibbs artifacts after reconstruction, serving as a robust, secondary watermark signature and/or tamper-evident marker that persists through compression, transformation, and even deepfake/AI manipulations (e.g., generative adversarial AI manipulations and attacks). In some embodiments, the artifacts provide an additional layer of traceability and tamper-evidence and, being a byproduct of transform-domain discontinuities, are difficult to remove without significant loss of quality or obvious tampering. Accordingly, in some embodiments, even if the primary watermark is partially degraded, the presence of the Gibbs artifacts provides a secondary validation layer.

In some embodiments, the Gibbs artifacts can be entangled/mathematically linked (e.g., via their pattern) to the original watermark and/or ebit thereby facilitating the use of the artifacts as forensic evidence of ownership and/or tampering.

By illustrating who owns the digital asset, the disclosed framework can facilitate, for example, identification of digital content as being deepfake content, the takedown of the deepfake content, payment to the owner, and the like.

In some embodiments, the deepfake-resistant framework provides a quantum-resilient frequency trace. For example, in some embodiments, the framework binds the frequency-based identifiers/watermarks to entanglement/physics constraints. As an example, in some embodiments, the watermark is not just inserted arbitrarily—it is mathematically and physically linked/entangled with the ebit and/or the asset's intrinsic physical features. For example, in some embodiments, the framework leverages physical properties of the digital asset—such as Laplacian edges, eigenfunctions, symmetry, or conservation laws—and modulates or maps the watermark according to these features. In some embodiments, such an approach is designed to withstand not only classical attacks (e.g., brute-force, statistical analysis) but also future quantum attacks (such as those enabled by Shor's algorithm and Grover's algorithm, which can break traditional cryptography) because the security and persistence of the watermark do not rely on mathematical problems (e.g., factoring) that quantum computers can solve, but on the physical and structural properties of the digital asset. Moreover, in some embodiments, the approach ensures persistence across compression, adversarial generative attacks, and generative model "washing," for example.

In some embodiments, such embedding techniques enable these frequency-based watermarks/identifiers to persist across modality transformations, such as when video frames are converted into images, audio is transcribed into text, or multimedia files are compressed or reformatted into derivative types, thereby maintaining ownership traceability across diverse domains and ecosystems. Moreover, in some embodiments, the framework is a cross-validation system for, inter alia, audio, video, and image authenticity.

In some embodiments, the framework embeds and entangles a watermark across multiple frequencies (e.g., across low- and/or mid-frequency bands) and utilizes redundancy layers thereby increasing resistance to obfuscation techniques and enabling identification of where any edits/ tampering occurred and how severe the edits/tampering are. For example, in some embodiments, the framework can embed a watermark in multiple parts of a digital asset (e.g., frames, frequency ranges, data blocks, and the like), entangle the embedded watermark, and then later for validation can utilize parity/share checks at a block level, for example, such that edits/tampering can be localized by mapping block failures. Moreover, such an embedding and entanglement technique can allow the framework to combine many block checks to produce a confidence score (e.g., 95% of block parities match). In some embodiments, the framework can continuously monitor signaling from embedded identifiers in real time and determine a detection confidence percentage or threshold. For example, in some embodiments, the framework can define a detection threshold (e.g., 80%, 90%, or dynamically set based on noise or distortion levels) at which an embedded identifier is considered verified. In some embodiments, the framework can perform multi-basis verification by performing authentication across complementary measurement bases to ensure robust verification even if some measurements are compromised.

In some embodiments, such thresholding enables constant real-time monitoring without requiring perfect signal recovery, thereby allowing the framework to adaptively detect tampering or cloning attempts under varying conditions (e.g., compression, transformation, partial corruption, and the like). In some embodiments, such continuous monitoring can identify unauthorized manipulations of digital assets by detecting frequency pattern disruptions, even in sophisticated deepfakes, for example. In some embodiments, the framework can utilize detection thresholds/quantitative boundaries (e.g., ≥20% match) to distinguish fair use from infringement thereby providing a clear evidentiary standard for authenticity and infringement, for example.

In some embodiments, the framework can not only flag digital content that has been manipulated (e.g., potential deepfakes), but the framework can also provide explanations for why certain content has been flagged, such as by highlighting visual evidence of manipulation, identifying specific frequency anomalies, quantifying confidence levels, and illustrating an authentication token verification status.

In some embodiments, the framework can resist adversarial transformations by incorporating adversarial training, robust encoding functions, and/or resilient embedding strategies, thereby ensuring watermark/ebit verification even when content is regenerated or altered by generative adversarial networks, diffusion-based models, or other machine learning-driven perturbations.

In some embodiments, the framework comprises an AI transformation engine for stress testing the robustness and resilience of the embedded frequency-based identifiers/watermarks. In some embodiments, this testing engine simulates a wide range of adversarial and real-world transformations—including, but not limited to, deepfake generation, style transfer, upscaling, denoising, compression, and other generative model manipulations—that digital assets may encounter in uncontrolled environments. By subjecting watermarked content to these AI-driven alterations, in some embodiments, the framework can rigorously assess the persistence, detectability, and integrity of both the core watermark and any embedded artifacts. In some embodiments, the results of this stress testing inform iterative improvements to the encoding algorithms, ensuring that the watermark remains reliably detectable and tamper-evident even after exposure to advanced AI transformations.

In some embodiments, the framework can implement a continuous protection cycle that ensures authentication remains robust—even as threats evolve—by: generating quantum-resistant authentication tokens based on quantum randomness; embedding the tokens and frequency signatures into original digital assets; utilizing quantum decay principles by limiting exposure to prevent token replay attacks and reduce vulnerability windows; and automatically rotating authentication parameters to maintain protection strength.

In some embodiments, the disclosed framework utilizes quantum algorithms not only for data protection and authentication, but also for efficient data search, analysis, and traversal within large-scale digital environments, such as those involving large language models (LLMs) or extensive digital asset repositories. For example, in some embodiments, the framework leverages quantum algorithms such as Shor's algorithm and Grover's algorithm to enhance the processing capabilities of the system. Shor's algorithm, while primarily known for its ability to factor large integers and compute discrete logarithms exponentially faster than classical algorithms, can be adapted in some embodiments to facilitate the decomposition, segmentation, or cryptanalysis of large data subsets. This capability can be particularly advantageous in scenarios where rapid analysis or partitioning of complex datasets is required, such as in the context of digital asset management or forensic investigation. Grover's algorithm, which provides a quadratic speedup for searching unsorted databases, can be utilized in some embodiments to significantly accelerate the search and retrieval of information within large, unstructured datasets or the parameter space of LLMs. By applying Grover's algorithm or quantum-inspired search techniques, the system can exponentially increase the speed and efficiency with which it traverses, queries, or matches patterns within existing LLMs or other data-intensive environments.

According to some embodiments, the disclosed systems and methods can be implemented on classical computing devices, quantum-inspired computing devices, and/or quantum computing devices (including non-binary devices such as qutrit- or qudit-based architectures).

In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device (e.g., a traditional computing device, a quantum computing device, a quantum-inspired computing device, for example) cause at least one processor to perform a method for deepfake-resistant data authentication.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTIONS OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
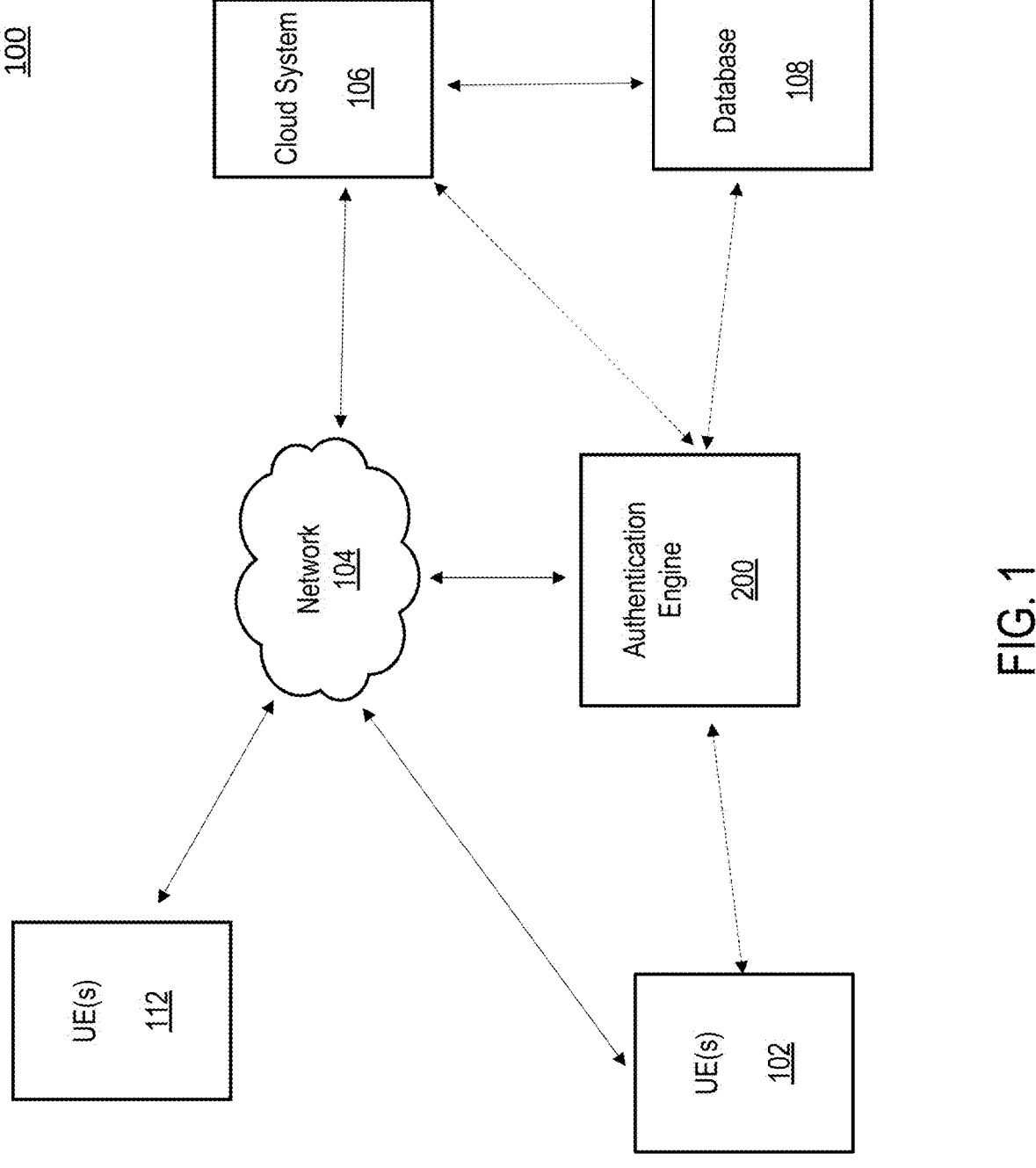
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some embodiments, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth™, 802.11b/a/g/n/ac/ax/be, or the like. Network access technologies may enable wide area coverage for devices, such as client devices with varying degrees of mobility, for example. In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

For the purposes of this disclosure, the term "digital asset" should be understood to refer to any item of content or data that is stored, transmitted, managed, or processed in a digital form on electronic or machine-readable media and that represents value, functionality, or informational content. By way of example, and not limitation, a digital asset can include still images, video files, audio recordings, documents (e.g., text files, PDFs, presentations, spreadsheets), executable code or software libraries, configuration files, 3D models, design or source files (e.g., CAD, Photoshop, Figma), fonts, templates, databases or datasets, web pages or markup, machine learning models, digital certificates or cryptographic keys, domain name registrations, blockchain tokens or smart contracts, and any combination thereof. A digital asset may reside on local or networked storage (including SAN, NAS, or cloud storage), may be streamed or distributed via content delivery networks or peer-to-peer systems, and may be accessed or modified by a variety of devices, applications, or services according to applicable protocols and permissions.

According to some embodiments, as discussed herein, the disclosed systems and methods provide for quantum-based encoding of deepfake-resistant, frequency-based identifiers into digital assets.

In some embodiments, the framework can mirror quantum security principles by prioritizing detection over concealment, much like quantum cryptographic systems. In contrast, traditional watermarking and steganographic techniques generally prioritize concealment over detection, such as by embedding a watermark in the raw pixel/audio space of digital content (e.g., by editing pixel values in the spatial domain of an image or editing amplitude values in the time domain of an audio sample). These traditional watermarking and steganographic techniques generally break down when subjected to lossy compression algorithms (e.g., JPEG, MP3, MP4) which are designed to eliminate "insignificant" data to reduce file size because traditional watermarking signals generally fall within a discarded layer/data, rendering the traditional watermarks fragile or undetectable after compression.

Thus, identifying the origin or ownership of a digital asset with a traditional watermark may be impossible after the digital asset is subject to a lossy compression algorithm or resizing, let alone interference/alterations from generative and/or deepfake AI models. Moreover, traditional watermarking and steganographic techniques may be format specific and thus fail when watermarked content is converted to another format (e.g., image to video frame, audio to text, and the like). In addition, traditional watermarking and steganographic techniques generally offer no post-deployment insight. For example, there may be no embedded audit trail if data is tampered with. Moreover, traditional watermarking and steganographic techniques may simply indicate whether a watermark is present or missing from a digital asset and thus validation is binary and cannot consider degrees of tampering or what portions of the digital asset were tampered with.

In some embodiments, the framework can address these and/or other issues with traditional watermarking and steganographic techniques by encoding frequency-based identifiers/watermarks in a frequency domain of a digital asset; intentionally introducing Gibbs artifacts into the digital asset; and/or binding the frequency-based identifiers to entanglement/physical constraints, thereby ensuring that ownership and tampering can be identified even after compression, noise, and interference from generative/deepfake AI models. In some embodiments, the frequency-based identifiers can be incorporated into anyone's/any entity's watermark thereby enabling, inter alia, the quantum-based data protection, tracking, identification, and degrees of tamper detection discussed herein while maintaining a specific look or other aspects (e.g., branding) of the watermark. Moreover, by implementing quantum-inspired entanglement, the framework further increases resilience to forgery and other attacks by requiring a malicious party to have access to not only the digital asset, but also the securely stored ebit to attempt to forge the digital asset. In some embodiments, the framework maintains an off-chain original and a frequency-encoded digital twin whose identifiers are entangled with off-chain ebits for verification and enforcement such that attempted forgery would require a malicious party to have access to the securely stored original (which, e.g., can be stored in a quantum-secure vault), the digital twin (i.e., the encoded/entangled digital asset), and the ebit. In some embodiments, such an approach makes forgery impractical and/or impossible.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 7), UE 112 (which can be the same, similar, or a different device from UE 102), network 104, cloud system 106, database 108 and authentication engine 200. It should be understood that while system 100 is depicted as including such components, it should not be construed as limiting, as one of ordinary skill in the art would readily understand that varying numbers of UEs, peripheral devices, sensors, cloud systems, databases and networks can be utilized; however, for purposes of explanation, system 100 is discussed in relation to the example depiction in FIG. 1.

According to some embodiments, UEs 102, 112 can be any type of device, such as, but not limited to, a mobile phone, a tablet, a laptop, a desktop computer, a server, a sensor, an IoT device, a wearable device, an autonomous machine, a smart television, a set-top box (STB), a media streaming device, a game console, or any other device equipped with a cellular transceiver, a wireless transceiver, and/or a wired transceiver.

In some embodiments, peripheral devices (not shown) can be connected to either or both UEs 102, 112 and can be any type of peripheral device, such as, but not limited to, a wearable device (e.g., a smart ring, a smart watch, or the like), printer, speaker, sensor, and the like. In some embodiments, a peripheral device can be any type of device that is connectable to UEs 102, 112 via any type of known or to be known pairing mechanism, including, but not limited to, WiFi, Bluetooth™, Bluetooth Low Energy (BLE), NFC, and the like.

In some embodiments, UEs 102, 112 can include and/or correspond to, but not be limited to, any type of device, component and/or sensor associated with a location of system 100 (referred to, collectively, as "sensors"). In some embodiments, the UEs 102, 112 can be any type of device that is capable of sensing and capturing data/metadata related to activity of the location. In some embodiments, the sensors can be associated with devices associated with the location of system 100, such as, for example, STBs, access point devices, televisions, personal assistants (e.g., Alexa®, Nest®, for example)), smart phones, smart watches or other wearables, tablets, personal computers, and the like, and some combination thereof. In some embodiments, UEs 102, 112 can be associated with any device connected and/or operating on cloud system 106 (e.g., a cloud-based device, such as a server that collects information related to the location, for example).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 can be any type of cloud operating platform and/or network-based system upon which applications, operations, and/or other forms of network resources may be located. For example, system 106 can be a service provider and/or network provider from where services and/or applications may be accessed, sourced or executed from. For example, system 106 can represent the cloud-based architecture associated with a service provider, content provider, internet service provider (ISP), communication service provider (CSP), and the like, which has associated network resources hosted on the internet or private network (e.g., network 104), which enables (via engine 200) the quantum-based, deepfake-resistant data authentication discussed herein.

In some embodiments, cloud system 106 can include a server(s) and/or a database of information which is accessible over network 104. In some embodiments, a database 108 of cloud system 106 can store a dataset of data and metadata associated with local and/or network information related to a user(s) of the components of system 100 and/or each of the components of system 100 (e.g., UE 102, UE 112, and the services and applications provided by cloud system 106 and/or authentication engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
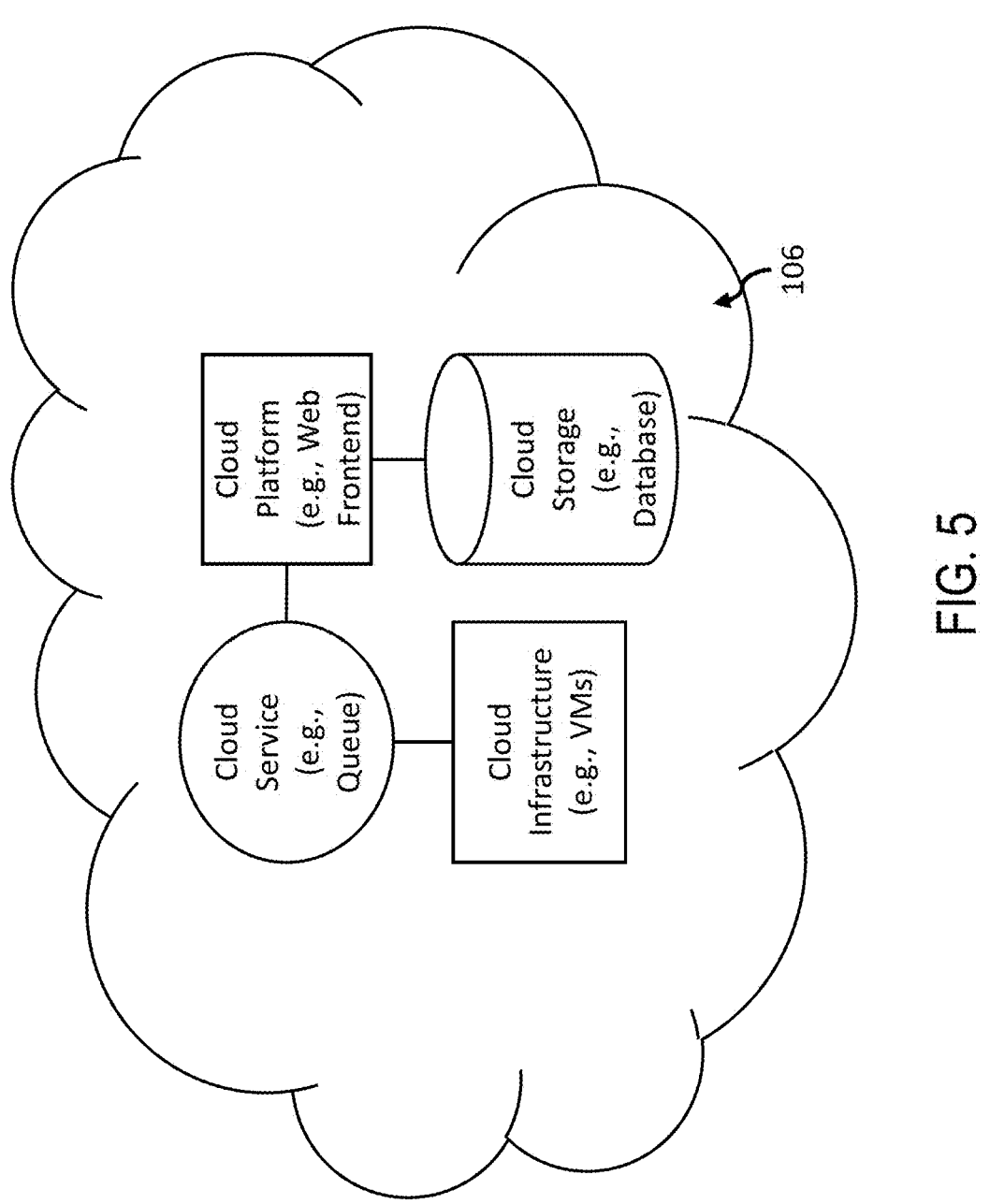
FIG. 5 depicts an exemplary implementation of an architecture according to some embodiments of the present disclosure.
Figure 6:
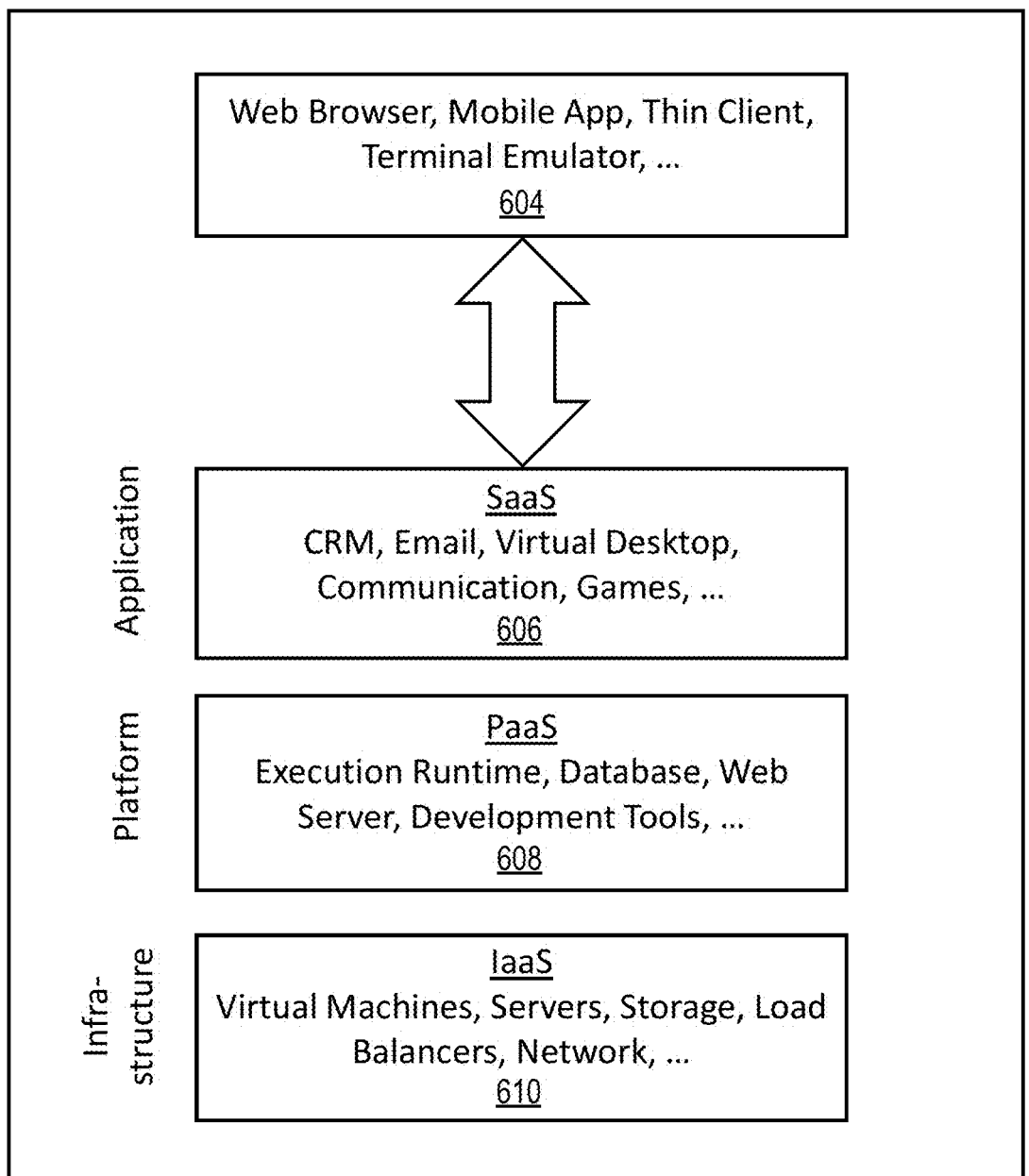
FIG. 6 depicts an exemplary implementation of an architecture according to some embodiments of the present disclosure.

Turning to FIGS. 5 and 6, in some embodiments, the exemplary computer-based systems/platforms, the exemplary computer-based devices, and/or the exemplary computer-based components of the present disclosure can be specifically configured to operate in a cloud computing/architecture 106 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of non-limiting embodiments of the cloud computing/architecture(s) in which the exemplary computer-based systems for deepfake-resistant digital asset authentication of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 can receive storage instructions/requests from, for example, engine 200 (and associated microservices), which may be in any type of known or to be known format, such as, for example, structured query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Authentication engine 200, as discussed above and further below in more detail, can include components for the disclosed functionality. According to some embodiments, authentication engine 200 can be a special purpose machine or processor, and can be hosted by a device on network 104, within cloud system 106, on UE 102 and/or on UE 112. In some embodiments, engine 200 can be hosted by a server and/or set of servers associated with cloud system 106.

According to some embodiments, authentication engine 200 or other device(s) running Processes 300-400, discussed infra, can be operated entirely at the user device level (or local or local network (e.g., Wi-Fi) level), and/or in some embodiments, with cloud support as a distributed system, or at a service provider's infrastructure, as non-limiting implementation examples. It will be understood that the disclosure herein provides for a configuration that is platform agnostic and can be operated on multiple alternative platforms as a matter of design choice using the teachings described.

According to some embodiments, as discussed in more detail below, authentication engine 200 can be configured to implement and/or control a plurality of services and/or microservices, where each of the plurality of services/microservices are configured to execute a plurality of workflows associated with performing the disclosed deepfake-resistant digital asset authentication. Non-limiting embodiments of such workflows are discussed and provided below.

According to some embodiments, as discussed above, authentication engine 200 can function as an application provided by a content and/or service provider and/or cloud system 106. In some embodiments, engine 200 can function as an application installed on a server(s), network location and/or other type of network resource associated with system 106. In some embodiments, engine 200 can function as an application installed and/or executing on UE 102 and/or UE 112. In some embodiments, such application may be a web-based application accessed by UE 102 and/or UE 112, and/or devices accessible over network 104 from cloud system 106. In some embodiments, engine 200 can be configured and/or installed as an augmenting script, program or application (e.g., a plug-in or extension) to another application or program provided by cloud system 106 and/or executing on UE 102 and/or UE 112. Accordingly, as provided below, engine 200 can execute on a device, at a network location, on nodes of a network and/or across a network, on differing components to perform the operations of each module executing therein.

Figure 2:
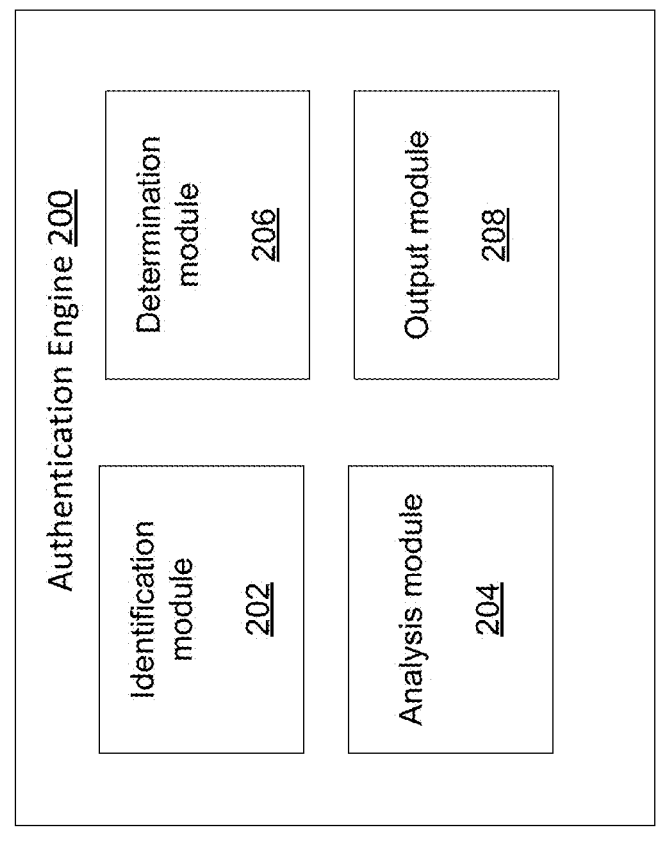
FIG. 2 is a block diagram illustrating components of an exemplary system according to some embodiments of the present disclosure.

As illustrated in FIG. 2, according to some embodiments, authentication engine 200 includes identification module 202, analysis module 204, determination module 206 and output module 208. It should be understood that the engine (s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
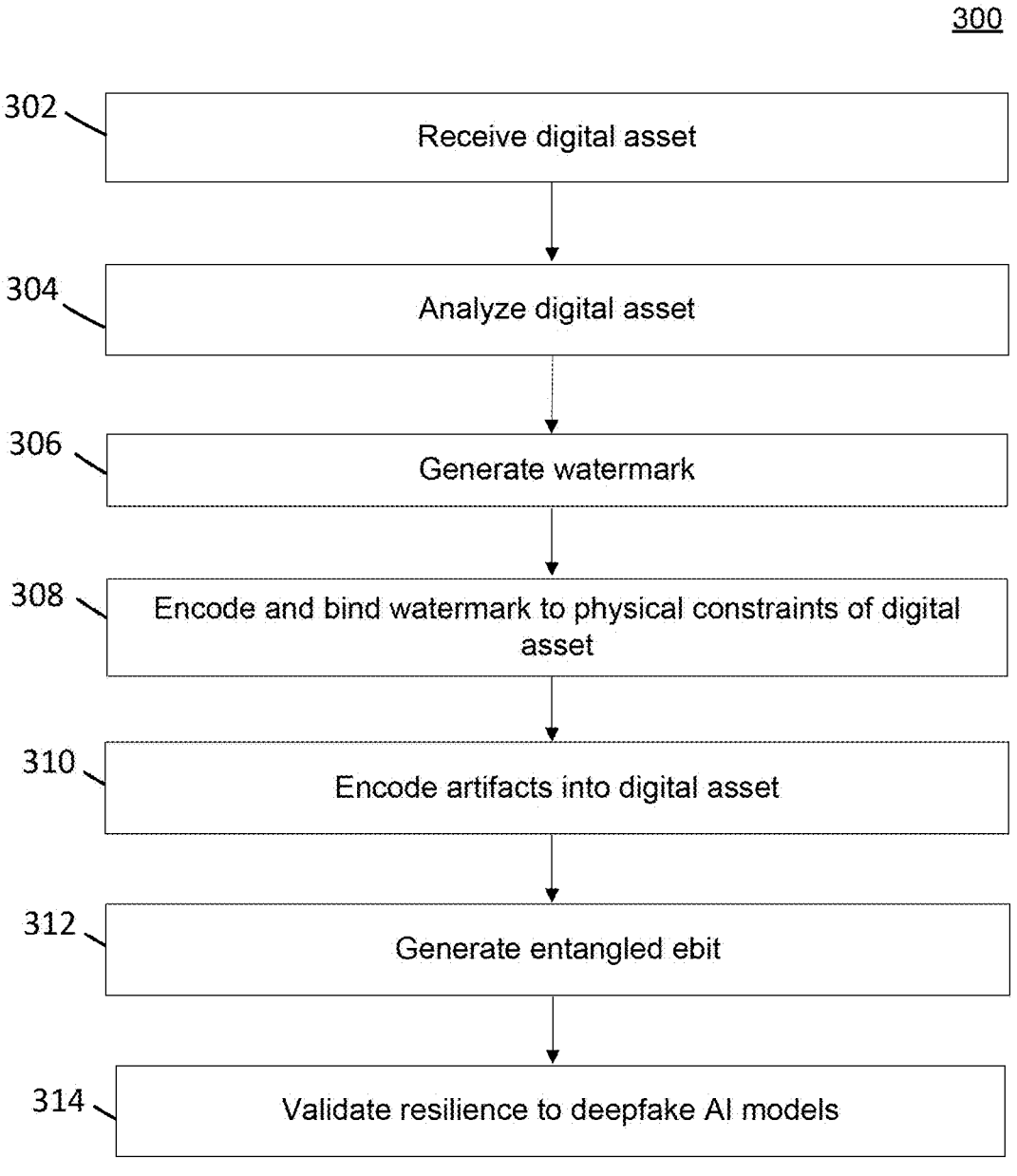
FIG. 3 illustrates an exemplary workflow according to some embodiments of the present disclosure.

Turning to FIG. 3, Process 300 provides non-limiting example embodiments for the disclosed quantum-based, deepfake-resistant digital asset authentication. As discussed herein, Process 300 provides operational steps for leveraging principles from quantum mechanics to embed/encode frequency-based identifiers (e.g., a watermark/qbit) in the frequency domain of a digital asset; bind the frequency-based identifiers to entanglement/physics constraints; and to intentionally introduce Gibbs artifacts into the digital asset thereby enabling authentication of the digital asset even after the digital asset has been subjected to alterations from generative/deepfake AI models.

According to some embodiments, Step 302 of Process 300 can be performed by identification module 202 of authentication engine 200; Steps 304 and 314 can be performed by analysis module 204; and Steps 306, 308, 310, and 312 can be performed by output module 208. In some embodiments, one or more of Steps 302-314 can be performed by a combination of the identification module 202, the analysis module 204, the determination module 206, and/or the output module 208.

According to some embodiments, Process 300 begins with Step 302 where engine 200 can receive a digital asset. As discussed herein, digital assets can include, but are not limited to, image files, movies, video files, songs, audio files, documents, e-books, maps, digital artwork, design files, presentations, spreadsheets, datasets, software, CAD files/3D models, and any other data or collection of data in digital form. For example, in some embodiments, the digital asset can comprise digital content data. In some embodiments, engine 200 can receive the digital asset via UE 102, UE 112, cloud system 106, and/or database 108. For example, in some embodiments, a user can upload or transmit the digital asset over network 104 to engine 200 using UE 102 and/or UE 112. In addition or alternatively, in some embodiments, the user can upload or transmit (e.g., via UE 112) the digital asset over network 104 to cloud system 106, database 108, and/or UE 102, where the uploaded digital asset can be accessible to engine 200. In some embodiments, the user can be or can be associated with the creator and/or owner of the digital asset, for example. In addition or alternatively, in some embodiments, the digital asset can comprise intellectual property of the user (e.g., created digital content files, objects and/or data structures, for example, as discussed supra).

In some embodiments, receiving the digital asset can comprise storing the received digital asset in memory, such as in database 108, for example.

In Step 304, engine 200 can analyze the digital asset. In some embodiments, analyzing the digital asset can include preprocessing the digital asset to identify a format/file type of the digital asset (e.g., image, audio, video, text, CAD model, and the like). For example, in some embodiments, engine 200 can identify whether the digital asset is an image, audio file, video file, or the like by parsing a file header of the digital asset.

In addition or alternatively, in some embodiments, analyzing the digital asset can include determining and extracting physical properties of the digital asset, such as a Laplacian operator, eigenfunctions, and/or eigenvalues. In some embodiments, extracting the physical properties of the digital asset comprises identifying transform-domain features of the digital content data corresponding to Laplacian edges or eigenfunctions. For example, in some embodiments, engine 200 can determine the Laplacian operator to identify edges, contours, or regions of high spatial frequency (which, e.g., can be indicative of significant structural features). As another example, in some embodiments, engine 200 can use analogous differential or spectral operators to highlight abrupt transitions or salient features (e.g., such as in the case of audio or other signal data). In addition or alternatively, in some embodiments, engine 200 can determine the eigenfunctions and corresponding eigenvalues of the Laplacian (or other relevant operators such as DCT, FFT, or graph Laplacian for structured or networked data). In some embodiments, these eigenfunctions represent the fundamental modes or basis functions that characterize the digital asset's physical structure in the transform domain. By extracting these physical properties, in some embodiments, engine 200 can identify robust (e.g., perceptually significant) locations or coefficients for watermark embedding. As discussed infra with regard to Step 308, in some embodiments, engine 200 can bind a watermark—the generation of which is discussed infra with regard to Step 306—to these extracted physical properties during the encoding/embedding process by, inter alia, modulating the watermark signal according to the strength or spatial distribution of the Laplacian, and/or by encoding watermark bits in coefficients associated with selected eigenfunctions. In some embodiments, this binding enhances the persistence and tamper-resistance of the watermark by leveraging the digital asset's inherent structural features.

In addition or alternatively, in some embodiments, analyzing the digital asset can involve adapting Shannon entropy into a quantum-based framework to define secure limits for data transfer and modeling how entangled qbit and ebit pairs can maintain fidelity through secure transmission (e.g., maintain quantum entanglement across data transfers). For example, in some embodiments, analyzing the digital asset can comprise identifying or determining a payload capacity of the digital asset. Moreover, in some embodiments, engine 200 can implement the relationship $Ni+E[qq] \geq Q[q \rightarrow q]$ to preserve entanglement/fidelity during communication or verification. Ni represents the number of bits to be embedded into the digital asset (e.g., the embedded qbit or watermark payload). In some embodiments, Ni can be constrained by $C_{total}$. E represents the amount of information/number of bits stored off-chain (e.g., the ebit). Q represents the "quantum channel capacity," or the fidelity requirement (e.g., the quantum-like throughput required for the qbit/watermark payload and entangled ebit binding to be recovered reliably during validation). Q can be based on, for example, how much compression and noise the embedded qbit/watermark must survive, a validation accuracy target, a payload size, and the like. Accordingly, since Ni is constrained by $C_{total}$ a greater amount of information may be required to be stored off-chain and entangled with the embedded qbit/payload to satisfy the inequality $Ni+E[qq] \geq Q[q \rightarrow q]$.

In addition, in some embodiments, engine 200 can tokenize the digital asset based on the identified format/file type. As an example, in some embodiments, if the digital asset is an image, the engine 200 can tokenize the image by breaking the image into blocks (e.g., 8×8 pixels) and extracting frequency-domain descriptors (e.g., DCT, FFT, or DWT coefficients). Alternatively, in some embodiments, the engine 200 can tokenize an image using raw-pixel or block-based hashing, color histograms, perceptual hashes, local feature descriptors, semantic or object tokens, deep-learning embeddings, or the like. As another example, in some embodiments, if the digital asset is a video, the engine 200 can tokenize the digital asset using raw-frame or thumbnail hashing, keyframe extraction and image tokenization, spatio-temporal transform coefficients, optical flow or motion vectors, temporal perceptual hashing, audio-visual fusion, shot/scene semantics, object/action tokens, deep video embeddings, or the like. As yet another example, if the digital asset is audio, the engine 200 can tokenize the digital asset by using raw-sample or frame-based hashing, spectral peak landmarks (e.g., by performing a STFT), Mel-Frequency Cepstral Coefficients (MFCCs), perceptual hashing, chroma and Tonnetz features, wavelet-domain coefficients, temporal perceptual hash sequences, deep-learning embeddings, ASR-based semantic tokens, or the like. In some embodiments, the engine 200 can utilize any known or to be known tokenizing techniques based on the format of the digital asset.

In some embodiments, engine 200 can utilize tokenization techniques as part of preprocessing, where data (e.g., text, image features, audio signals, or encoded watermark coefficients) is segmented into tokens that are then mapped into an embedding space. Such tokenized embeddings can be input into trained ML models, thereby allowing consistent analysis across heterogeneous data types. In some embodiments, tokenization further supports traceability by ensuring that each token can be linked back to its entangled watermark/ebit pair for verification.

In some embodiments, engine 200 enables traceability of embedded watermarks or frequency-based identifiers through Markovian evolution, such that the process of tracking or detecting the watermark within outputs generated by a LLM or other AI system does not require any knowledge of, memory from, or influence on the internal state or architecture of the LLM. For example, in some embodiments, the traceability mechanism operates in a memoryless fashion, wherein each detection or search step depends on the current observable output, without reliance on the LLM's prior outputs, internal weights, or historical state transitions. This approach allows for the detection and verification of watermarks and digital assets in a manner that is non-intrusive to the LLM system. Moreover, in some embodiments, the search for the watermark can be conducted in a cloaked or stealthy manner, such that the LLM is neither aware of the detection process nor affected by it. As a result, engine 200 can facilitate forensic analysis and persistent traceability of digital assets, even in adversarial or closed environments where the LLM is proprietary, inaccessible, or uncooperative.

Accordingly, as discussed herein, such analysis can involve engine 200 implementing any type of known or to be known computational analysis technique, algorithm, mechanism or technology. In some embodiments, engine 200 can include a specific trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 can leverage an LLM (s), whether known or to be known. As discussed herein, an LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. Such includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 can be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the data, as discussed herein.

In some embodiments and, optionally, in combination of any embodiment described above or below, a neural network technique can be one of, without limitation, feedforward neural network, radial basis function network, recurrent neural network, convolutional network (e.g., U-net) or other suitable network. In some embodiments and, optionally, in combination of any embodiment described above or below, an implementation of Neural Network can be executed as follows:

a. define Neural Network architecture/model,
    b. transfer the input data to the neural network model,
    c. train the model incrementally,
    d. determine the accuracy for a specific number of timesteps,
    e. apply the trained model to process the newly-received input data,
    f. optionally and in parallel, continue to train the trained model with a predetermined periodicity.

In some embodiments and, optionally, in combination of any embodiment described above or below, the trained neural network model can specify a neural network by at least a neural network topology, a series of activation functions, and connection weights. For example, the topology of a neural network can include a configuration of nodes of the neural network and connections between such nodes. In some embodiments and, optionally, in combination of any embodiment described above or below, the trained neural network model can also be specified to include other parameters, including but not limited to, bias values/functions and/or aggregation functions. For example, an activation function of a node can be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function can be a mathematical function that combines (e.g., sum, product, and the like) input signals to the node. In some embodiments and, optionally, in combination of any embodiment described above or below, an output of the aggregation function can be used as input to the activation function. In some embodiments and, optionally, in combination of any embodiment described above or below, the bias can be a constant value or function that can be used by the aggregation function and/or the activation function to make the node more or less likely to be activated.

In Step 306, engine 200 can generate a watermark/frequency-based identifier based on the analysis of the digital asset. For example, in some embodiments, the water-mark can be generated based on the determined payload capacity. In some embodiments, generating the watermark can comprise generating a unique digital fingerprint corresponding to the digital asset (e.g., based on the tokenized digital asset). For example, in some embodiments, engine 200 can utilize quantization, Vector of Locally Aggregated Descriptors (VLAD), Fisher vector aggregation, locality sensitive hashing, spectral or wavelet sketching, temporal hashing, landmark paring, or the like to generate the digital fingerprint of the digital asset. In some embodiments, as discussed infra, the watermark can be generated based on the extract physical properties of the digital asset.

In some embodiments, generating the watermark can further comprise encrypting the digital fingerprint of the digital asset, with the generated watermark comprising the encrypted digital fingerprint. For example, in some embodiments, engine 200 can encrypt the digital fingerprint using a cipher or a quantum-resilient cipher (e.g., lattice-based schemes, CRYSTALS-Kyber, AES-256, AES-256-GCM, and the like).

Additionally, in some embodiments, the watermark can comprise an encrypted payload including, but not limited to, the digital fingerprint, a license ID(s), a session key hash, and/or the like. For example, in some embodiments, the digital fingerprint and one or more other pieces of information or metadata (e.g., license ID(s), session key hash, and the like) can be serialized and encrypted (e.g., using a post-quantum Key-Encapsulation Mechanism (KEM) and AES-256 and/or other encryption methods).

In Step 308, engine 200 can encode/embed the watermark in the transform domain of the digital asset and bind the watermark to entanglement/physical constraints. In some embodiments, encoding the watermark can comprise converting the digital asset from the spatial/time domain to the frequency domain by, for example, applying the DCT or FFT to the digital asset, and then altering a specific subset of the resulting frequency coefficients. In some embodiments, as discussed herein, engine 200 can alter low- and/or mid-frequency coefficients such that the encoded watermark can be more resilient to compression or other transformations.

In some embodiments, engine 200 can encode the water-mark based on quantum principles. For example, in some embodiments, engine 200 can treat each frequency coefficient or bin as a qbit slot where information, analogous to a quantum bit state, is embedded while controlling the overall signal distortion using Shannon entropy and/or Nyquist rate constraints. These constraints can, for example, help determine how densely watermark information can be inserted without degrading quality or violating perceptual thresholds. For example, the Nyquist rate can be used to determine a maximum number of bits that can be encoded per second (e.g., in audio) or per spatial frequency (e.g., in images). Accordingly, Shannon and/or Nyquist rules can be used to determine how much quantum-style information can be "superposed" into a signal while keeping coherence.

In addition or alternatively, in some embodiments, engine 200 can encode the watermark based on quantum superposition. Such an approach can create a moving superposition around data subsets (e.g., image blocks, time frames, temporal frame windows) using embedded frequencies. For example, in some embodiments, engine 200 can encode the watermark across multiple orthogonal components of the digital asset, as described in greater detail below. In some embodiments, engine 200 can encode the watermark across multiple frequency bands such that the information exists in a combination of states and the information cannot be fully retrieved unless all of the bands are combined/interrogated together. In addition or alternatively, in some embodiments, engine 200 can encode the watermark across frequency, amplitude, and/or phase. This approach can simulate quantum superposition and can have benefits such as, but not limited to, multi-layer redundancy thereby increasing resilience, and improving imperceptibility. In some embodiments, to encode the watermark based on quantum superposition, engine 200 can apply STFT or the Hilbert Transform, modify the magnitude for amplitude encoding, and shift phase (e.g., using a mapped watermark phase code). Using the Hilbert Transform can, for example, allow information to be embedded in the complex plane, mimicking how a quantum bit represents data as a superposition of states (e.g., $|\psi\rangle=\alpha|0\rangle+\beta|1\rangle$). In some embodiments, engine 200 can utilize the concept of eigenstates when encoding the watermark. For example, the watermark signal can be decomposed into a set of basis functions corresponding to the eigenstates of the transformation domain (e.g., the eigenvectors of the DCT, FFT, or Hilbert operator applied to the digital asset). Each eigenstate represents a distinct, orthogonal mode in which information can be embedded, and the watermark can be encoded as a weighted combination of these eigenstates. In some embodiments, the encoded watermark may be represented as $|\psi\rangle=\Sigma_i\alpha_i|ei\rangle$, where $|ei\rangle$ denotes the i-th eigenstate of the transform domain and ai is the corresponding amplitude or coefficient determined by the watermark payload and encoding key. By distributing the watermark information across multiple eigenstates, the framework can achieve enhanced robustness against signal degradation, compression, and targeted attacks, since the watermark cannot be fully reconstructed unless the correct combination of eigenstates is accessed and coherently combined.

In some embodiments, encoding the watermark in terms of eigenstates further enables selective retrieval and validation, as the presence and integrity of the watermark can be verified by projecting the received signal onto the original eigenbasis and measuring the corresponding amplitudes. This approach can also allow for adaptive encoding, where the selection of eigenstates and their respective weights can be dynamically adjusted based on the entropy, perceptual significance, or security requirements of the digital asset. In some embodiments, the eigenstate encoding may be combined with key-based pseudo-random selection of basis functions, further obfuscating the watermark location and increasing resistance to unauthorized detection or removal.

In some embodiments, the position and weight of each frequency coefficient involved in the superposition can be defined using a key-based pseudo-random number generator (PRNG) and/or entropy thresholds, for example.

In addition or alternatively, in some embodiments, engine 200 can encode the watermark based on quantum entanglement. For example, in some embodiments, engine 200 can encode the watermark across different channels (e.g., of stereo or multi-channel audio systems) by embedding one part of the watermark in a first channel (e.g., a left channel) and another in a second channel (e.g., a right channel). Accordingly, in some embodiments, at a later point in time when the watermark is decoded for validation, a decoder can validate the watermark by checking for parity, correlations or anti-correlations between the channels.

In some embodiments, engine 200 mathematically and physically links/entangles the watermark with the digital asset's intrinsic physical properties, such as Laplacian edges, eigenfunctions, symmetry, or conservation laws. For example, in some embodiments, engine 200 can bind the watermark to these physical constraints by using determined/extracted physical properties of the digital asset, such as the Laplacian eigenvalues and eigenfunctions identified during the analysis of the digital asset (as discussed supra with regard to Step 304). For example, in some embodiments, engine 200 can modulate the watermark based on the physical properties, such as by scaling, shifting, or encoding the watermark based on the magnitude of Laplacian eigenvalues, the spatial distribution of edge locations, or the energy of specific eigenfunctions.

In some embodiments, engine 200 can employ a key or mapping function that binds the watermark to particular eigenfunctions, spatial regions, or frequency-domain locations, thereby creating a deterministic and reproducible link between the watermark and the digital asset's structure.

In some embodiments, engine 200 can embed the watermark by altering selected frequency coefficients in a manner that is mathematically tied to the physical properties, for example, by increasing or decreasing the amplitude of coefficients corresponding to regions with strong (e.g., exceeding a defined threshold) Laplacian responses or to specific eigenfunctions that are robust to common transformations, for example. In some embodiments, to further enhance robustness, engine 200 can distribute the watermark across multiple blocks, frequency bands, and/or eigenfunctions, and/or can apply error-correcting codes or redundancy schemes to ensure recoverability even if portions of the digital asset are lost or degraded.

In some embodiments, engine 200 can also enforce additional physical constraints during embedding, such as requiring the watermark pattern to exhibit certain symmetries (e.g., invariance under reflection, rotation, or other geometric transformations), or to comply with conservation laws (e.g., maintaining total energy or statistical invariants). In some embodiments, this approach ensures that the watermark is deeply integrated with the digital asset's physical and structural characteristics, making the embedded watermark highly persistent, tamper-evident, and resistant to removal or forgery such that forgery is rendered impractical and/or impossible. In some embodiments, engine 200 can map the watermark to features (e.g., eigenfunctions, keypoints) that themselves are invariant under a desired transformation and, in some embodiments, the watermark pattern is generated to align with these features. For example, in some embodiments, when generating the watermark (e.g., in Step 306), engine 200 can ensure that the watermark bit sequence is palindromic or otherwise symmetric about a central axis for reflection invariance. For rotation invariance, in some embodiments, engine 200 can configure the watermark as a circular or radial pattern, or as a sequence that repeats in a way that is unchanged by rotation (e.g., using cyclic codes). In some embodiments, engine 200 can generate the watermark so that it is duplicated or mirrored across the relevant axes or regions, ensuring that after transformation, the pattern remains detectable.

Additionally, in some embodiments, engine 200 can add a redundant layer of spatial encoding (e.g., using LSB techniques) that serves as a backup for traceability.

In Step 310, engine 200 can embed/encode artifacts, such as Gibbs artifacts, into the digital asset. In some embodiments, Gibbs artifacts can correspond to oscillatory patterns or distortions resulting from the Gibbs phenomenon, which typically arise near sharp transitions or discontinuities when a signal is approximated by a finite number of terms in a transform (such as DCT or FFT) and are generally considered undesirable in standard media processing. Here, however, in some embodiments, these artifacts are intentionally introduced as a robust, secondary identifying and tamper-evident signature. In some embodiments, engine 200 can introduce controlled discontinuities or sharp transitions by deliberately creating abrupt changes in pixel values, frequency coefficients, or amplitude/phase at specific, preselected locations or boundaries within the digital asset. In some embodiments, engine 200 configures these discontinuities or sharp transitions to produce subtle Gibbs artifacts after reconstruction, which persist through common signal processing operations, including lossy compression and generative or deepfake AI transformations.

To embed the artifacts, in some embodiments, engine 200 can identify boundaries or regions—such as block edges in images or frame boundaries in audio/video—where sharp transitions can be introduced. In some embodiments, engine 200 can introduce controlled discontinuities at block or boundary locations of the digital content data to produce transform-domain Gibbs artifacts. As an example, in some embodiments, engine 200 can modify pixel values or frequency coefficients at block edges to create abrupt changes. For example, in some embodiments, engine 200 can set the last pixel value of one block and the first pixel value of the next block to be significantly different (e.g., greater than a defined threshold). In addition or alternatively, in some embodiments, engine 200 can adjust high-frequency coefficients so that, after inverse transformation, a visible but subtle edge or "ringing" near a block boundary appears. In addition or alternatively, in some embodiments, engine 200 can insert abrupt amplitude or phase changes at the boundary between two frames or segments. In addition or alternatively, in some embodiments, engine 200 can adjust frequency coefficients to create a sharp transition in the waveform at a specific time point.

In some embodiments, engine 200 can control the magnitude, location, and/or pattern of the discontinuities such that the differences are large enough (e.g., about a defined threshold) to produce detectable Gibbs artifacts after inverse transformation, but small enough to remain imperceptible to human users. In some embodiments, engine 200 can encode the pattern, location, or amplitude of the artifacts with a key to link/bind the artifacts with the watermark. In some embodiments, the pattern of the artifacts (e.g., which blocks or boundaries were modified, the magnitude of the changes, and the like) can be serialized and stored as part of the entangled ebit that is stored off-chain as discussed infra with regard to Step 312.

In some embodiments, subsequent to embedding/encoding the watermark and/or artifacts, engine 200 can convert the digital asset back to the spatial/time domain (e.g., by applying the appropriate inverse transform).

In Step 312, engine 200 can generate the entangled ebit. In some embodiments, engine 200 can apply the same transform used in Steps 308 and/or 310 (e.g., DCT, FFT, STFT, Hilbert, and the like) to the watermarked digital asset in order to obtain the transform coefficients of the digital asset after the qbit/watermark and/or the artifacts have been encoded/embedded into the digital asset. Next, in some embodiments, engine 200 can extract the relevant coefficients of the transformed digital asset from the same positions or indices that were used to encode/embed the watermark and/or the artifacts into the digital asset. In some embodiments, the coefficients can be extracted according to a key(s) (which, e.g., can be the same key(s) that was used to select embedding positions).

In some embodiments, engine 200 can derive a tag (or authentication tag) from the qbit/watermark and/or artifacts embedding positions and extracted coefficient values by performing, for example, a mathematical operation such as a parity computation, an inner-product computation, a keyed message authentication code (MAC) computation, or the like over the extracted values. In some embodiments, engine 200 can bind the embedded qbit/watermark and/or the artifacts with the off-chain ebit by utilizing a quantum parity function thereby creating a mathematically linked pair that can only be fully verified by accessing both the in-media signal (e.g., the embedded qbit/watermark and/or artifacts) and its off-platform ebit counterpart. In some embodiments, this entanglement ensures that any attempt to forge, remove, or alter the watermark and/or artifacts without access to the ebit will be detectable, thereby providing robust, quantum-resilient authentication and tamper evidence.

In some embodiments, engine 200 can compute a stable representation of each of the extracted values (e.g., via quantization). In addition, in some embodiments, engine 200 can serialize the stable representations (e.g., quantized values) in a canonical order—such as lexicographical or index-based ordering—and apply a binding function (e.g., the quantum parity function) to the serialized values thereby producing the tag/authentication tag. In some embodiments, the entangled ebit comprises this tag. In some embodiments, the ebit comprises a plurality of tags, such an authentication tag associated with the watermark and another authentication tag associated with the artifacts. In some embodiments, engine 200 can implement hierarchical entanglement, wherein multiple layers of qbits/watermarks and/or artifacts are bound to corresponding sets of off-chain ebits. In some embodiments, such a structure provides tiered authentication and redundancy, ensuring that even if a subset of entanglements is removed or corrupted, additional layers remain available for ownership verification and tamper detection.

In some embodiments, the ebit can comprise the tag(s), an identity of the creator/owner of the digital asset, license ID/information, and/or embedding information associated with the watermark, such as an identifier of the transform(s) used to encode the qbit/watermark, coefficient selection scheme (e.g., which indices, bands, or ranges were used to encode the qbit/watermark), quantization parameters, a timestamp/nonce (e.g., to ensure that the ebit/tag is unique and to prevent replay), serialization order, and/or the like. In addition, in some embodiments, the ebit can comprise pattern information associated with the Gibbs artifacts, such as information related to the pattern, location, and/or parameters of the intentional Gibbs artifacts (e.g., which blocks, boundaries, or frequency bands were modified, and the magnitude of the discontinuities).

Including, inter alia, the coefficient indicis, quantization rules, and serialization order in the ebit can ensure that a verifier accurately recomputes an authentication tag for digital asset validation as discussed infra.

In some embodiments, engine 200 can store the generated ebit (e.g., in database 108). In some embodiments, the ebit can be stored using encryption (e.g., AES-256) and/or in a quantum-secure vault, for example. In some embodiments, as discussed herein, engine 200 maintains a securely stored (e.g., in a quantum-secure vault) off-chain original of the digital asset (which, in some embodiments, is never released such that, e.g., it cannot be scraped by LLMs) and generates a frequency-encoded digital twin of the digital asset whose identifiers are entangled with off-chain ebit(s) for verification and enforcement.

In Step 314, engine 200 can validate the resilience of the embedded watermark and/or artifacts to transformations and alterations from generative or deepfake AI models and/or the like. For example, in some embodiments, engine 200 comprises an AI transformation engine for stress testing the robustness and resilience of the embedded watermark and/or artifacts. In some embodiments, this testing engine simulates a wide range of adversarial and real-world transformations—including, but not limited to, deepfake generation, style transfer, upscaling, denoising, compression, geometric transformations (such as flipping, rotation, and cropping), adjusting color balances, applying filters, and other generative model manipulations—that digital assets may encounter in uncontrolled environments. By subjecting watermarked content to these AI-driven alterations, in some embodiments, engine 200 can rigorously assess the persistence, detectability, and integrity of both the core watermark and any embedded artifacts.

In some embodiments, engine 200 can apply any number of the transformations to the digital asset and then analyze the digital asset to determine whether the watermark and/or artifacts can still be reliably detected and validated. For example, in some embodiments, engine 200 can analyze and validate the watermark and/or artifacts as discussed infra with regard to Process 400, including, for example, the use of confidence thresholds, error correction, and redundancy checks. In some embodiments, the results of this stress testing inform iterative improvements to the watermark and artifact encoding algorithms, such as optimizing the choice of transforms, embedding locations, modulation parameters, error-correcting schemes, and the like. In some embodiments, this can ensure that the watermark and/or artifacts remain reliably detectable and tamper-evident even after exposure to advanced AI/deepfake transformations.

Accordingly, Steps 302-314 of Process 300 provide functionality to engine 200 to perform quantum-based, deepfake-resistant data authentication by, for example, embedding/encoding watermark(s) and/or Gibbs artifacts into a digital asset, binding the watermark to physical properties of the digital asset, entangling the watermark and/or artifacts with an ebit, and stress testing the resulting watermarked digital asset with an AI transformation engine. In some embodiments, this can ensure that digital asset can be authenticated (e.g., ownership can be identified via the embedded watermark and/or artifacts) even after the digital asset has been subjected to transformations or alterations from generative or deepfake AI models.

Figure 4:
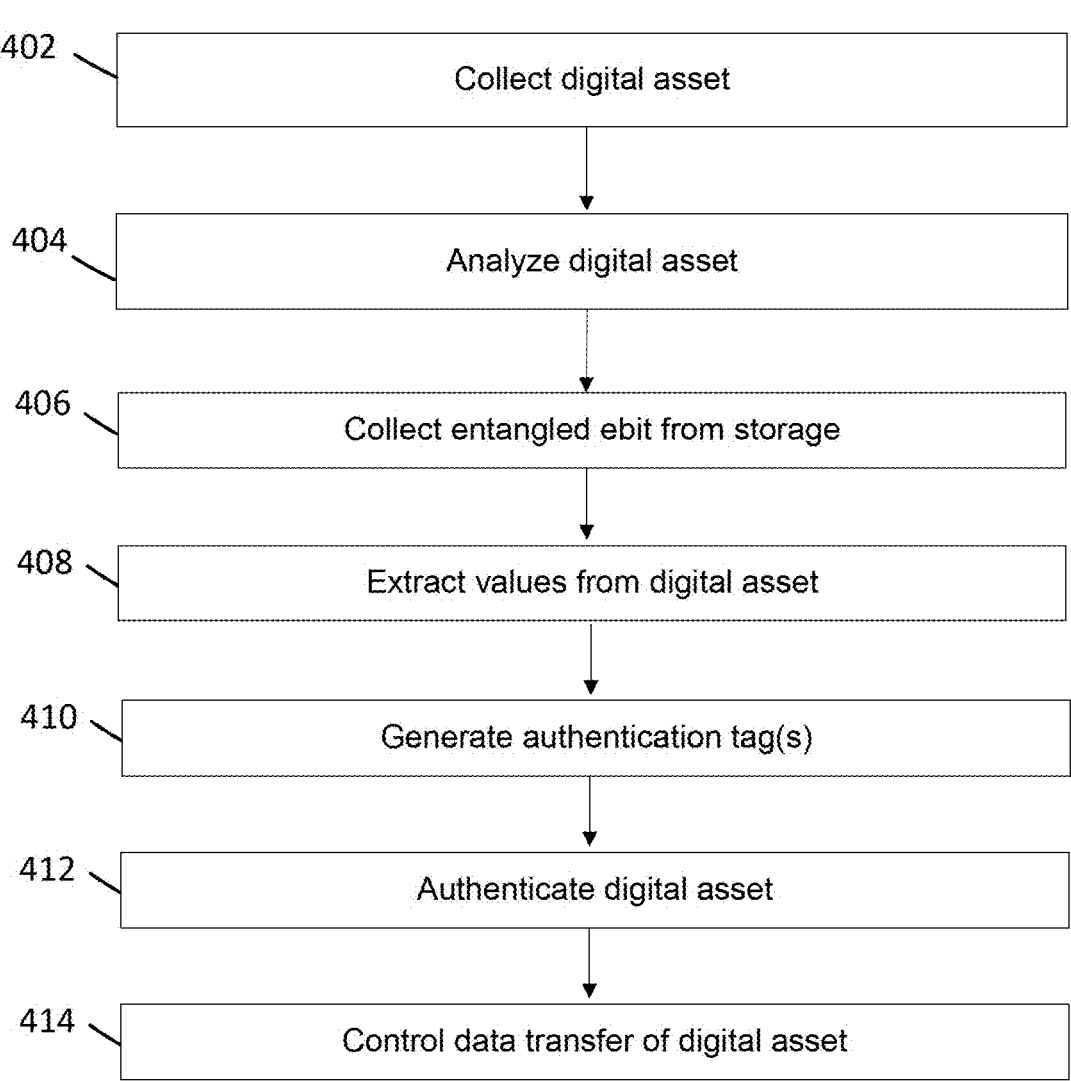
FIG. 4 illustrates an exemplary workflow according to some embodiments of the present disclosure.

Turning to FIG. 4, provided is Process 400 for non-limiting example embodiments for validating a digital asset having an encoded qbit/watermark and/or artifacts, as discussed supra.

According to some embodiments, Steps 402 and 406 of Process 400 can be performed by identification module 202 of authentication engine 200; Step 404 can be performed by the analysis module 204; and Steps 408, 410, 412, and 414 can be performed by output module 208. In some embodiments, one or more of Steps 402-414 can be performed by a combination of the identification module 202, the analysis module 204, the determination module 206, and/or the output module 208.

According to some embodiments, Process 400 begins with Step 402 where engine 200 can collect or identify a digital asset. For example, in some embodiments, subsequent to a watermarked digital asset being distributed/transferred (e.g., from database 108 after Step 314) to a public or other platform, engine 200 can collect or identify the watermarked digital asset (e.g., upon an ownership and/or acceptable use dispute regarding the digital asset). In some embodiments, engine 200 can collect the digital asset by loading or downloading the digital asset from a server or database (e.g., cloud system 106 or a different server/database) over the network 104. In some embodiments, engine 200 can receive and/or analyze the digital asset subsequent to the digital asset being subjected to transformations or alterations from generative or deepfake AI models.

In Step 404, engine 200 can analyze the digital asset. In some embodiments, analyzing the digital asset can comprise determining which ebit corresponds to the digital asset. For example, in some embodiments, a non-sensitive pointer or index may reference an ebit record such that a verifier can locate the ebit.

In Step 406, engine 200 can collect the appropriate entangled ebit from storage based on the analysis performed in Step 404. As an example, in some embodiments, engine 200 can retrieve the ebit from storage (e.g., database 108) upon identifying the ebit based on an in-media pointer and/or a public registry, for example.

In Step 408, engine 200 can extract values and/or coefficients of the digital asset based on information included in the collected ebit. For example, based on the information included in the collected ebit, engine 200 can identify the type of transform originally used to encode the watermark and/or artifacts into the digital asset (e.g., STFT, DCT, or FFT for frequency-domain decoding, Hilbert transform if phase-based encoding was used, or wavelet transforms if hierarchical embedding was used). In addition, in some embodiments, engine 200 can identify the key and/or decoding logic (e.g., which coefficients, bins, or regions were used to encode the watermark), the superposition pattern (e.g., where and how bits were split or spread during encoding), which parts of the digital asset are involved in each embedded watermark bit, and/or information related to the pattern, location, and/or parameters of the intentional Gibbs artifacts (e.g., which blocks, boundaries, or frequency bands were modified, and the magnitude of the discontinuities). This enables engine 200 to extract the values or coefficients used to originally generate the ebit/tag(s).

In Step 410, engine 200 can generate a new authentication tag(s) based on the extracted values or coefficients. In some embodiments, generating the authentication tag(s) can include the same or similar steps used to originally generate the ebit/the tag included in the ebit (e.g., in Step 312). For example, in some embodiments, engine 200 can compute a stable representation of each of the extracted values or coefficients in the same manner utilized to originally generate the ebit (e.g., by using the same quantization rules). In addition, in some embodiments, engine 200 can serialize the stable representations (e.g., quantized values) in the same canonical order used to generate the ebit and apply the same binding function (e.g., the quantum parity function) to generate the authentication tag(s).

In Step 412, engine 200 can authenticate the digital asset. In some embodiments, engine 200 can authenticate the digital asset to show, for example, who is the owner of the digital asset and/or to show whether the digital asset has been tampered with (e.g., copied, processed by generative/deepfake AI models, and the like). In some embodiments, this can be used to show, for example, that certain digital content includes and/or was generated using the digital asset (e.g., as input to a generative/deepfake AI model(s)). As an example, in some embodiments, engine 200 can authenticate/determine ownership of a digital asset that was transformed into a deepfake image, video, audio clip, or the like. By illustrating who owns the digital asset, engine 200 can facilitate, for example, identification of digital content as being deepfake content, the takedown of the deepfake content, payment to the owner, and the like.

In some embodiments, engine 200 can authenticate the digital asset based on the generated authentication tag(s). For example, in some embodiments, engine 200 can compare the collected ebit (or the tag included in the collected ebit) to the authentication tag generated in Step 410 and authenticate the digital asset based on this comparison (e.g., by illustrating that the extracted watermark and/or artifacts are consistent with reference/expected values/patterns stored in the ebit).

In some embodiments, a disagreement/difference between the in-media computed authentication tag(s) and off-chain ebit can indicate one or more of intentional tampering, distribution, destructive processing (e.g., heavy compression, filtering, and the like), or channel noise, for example. Accordingly, in some embodiments, engine 200 can determine whether the digital asset has been tampered with and/or distributed based on the comparison. In some embodiments, such tampering determination can provide usage analytics associated with the digital content data. In some embodiments, the tampering determination can generate information indicating at least one of a qualitative report or a quantitative report of the use of the digital content data. For example, a qualitative report can include descriptive indicators such as "unauthorized duplication detected," "attempted redistribution," and/or "modification from an unverified source," and the like, while a quantitative report can include numerical metrics such as the number of unauthorized access attempts, frequency or duration of use, percentage and/or portions of the digital content data altered, and the like. As an example, in some embodiments, engine 200 can utilize parity/share checks at a block or other unit (e.g., frame) level, for example, such that edits/tampering can be localized by mapping block/unit failures.

In some embodiments, engine 200 can authenticate/validate the digital asset by determining authenticity (and/or infringement) based on a threshold(s). For example, in some embodiments, engine 200 can authenticate/validate the digital asset when the authentication tag(s) and the ebit are within a threshold of similarity of each other. In some embodiments, engine 200 can produce a confidence score (e.g., 95% of block parities match) and can authenticate/validate the digital asset if the confidence score is above a defined threshold. In some embodiments, the framework can utilize detection thresholds/quantitative boundaries (e.g., ≥20% match) to distinguish fair use from infringement thereby providing a clear evidentiary standard for authenticity and infringement, for example.

In some embodiments, engine 200 can utilize physics constraints, reflection and bifurcation principles to show use of digital assets by existing/trained AI models and to enable data subsets to reappear thereby countering arguments that, for example, compression destroyed the evidence. In some embodiments, engine 200 can incorporate physics-informed constraints into an encoding and analysis process. For example, in some embodiments, an autoencoder or similar model can be configured to enforce physical laws (e.g., conservation principles, reflection symmetry, or no-cloning restrictions) as part of its training or inference process. In such embodiments, engine 200 can generate a mirror-reflected representation of the encoded data subset, which must remain consistent with the original under the applied physical constraints. As an example, if a cloned or unauthorized copy fails to satisfy these constraints, the subset can be automatically invalidated or rendered untrainable, while the original encoded data remains verifiable and traceable through the authentication framework described herein. In some embodiments, engine 200 can detect and flag reflected subsets even when a portion was discarded during compression. In some embodiments, a physics-informed autoencoder computes node-level error metrics and Jacobian-based consistency checks to detect anomalies and enforce constraint compliance.

In some embodiments, constraints can include, without limitation, bifurcation-based stability models, tessellation and billiard reflections, physics-informed operators (e.g., Laplacian or fractional Laplacian), and quantum logic primitives (e.g., Hadamard, CNOT), applied individually or in combination to enforce non-cloning and reflection rules.

In Step 414, engine 200 can control data transfer of the digital asset (e.g., from database 108 to system 106 or within another platform/server) based on the stored ebit/authentication performed in Step 412. For example, in some embodiments, engine 200 can remove read/write access and/or render the data inaccessible via the ebit, which can ensure, via the ebit entanglement, that data is used and/or managed in a manner that satisfies the UE/user and/or application that controls a corresponding ebit. In some embodiments, engine 200 can control transfer/transmission of the digital asset based on the ebit by revoking any access tokens or API routes to a compromised digital asset (e.g., such that the digital asset becomes unusable or watermarked as "violated" on external platforms) when the digital asset fails validation.

Accordingly, by executing the steps outlined in Process 400, discussed supra, engine 200 enables a robust framework that leverages quantum principles to authenticate a digital asset—watermarked by quantum-based frequency encoding and entangled with an ebit—by determining whether the digital asset has been tampered with and/or distributed, and/or by determining ownership of the digital asset.

In some embodiments, engine 200 can further comprise an autonomous monitoring agent that continuously queries target ecosystems or platforms to detect occurrences of protected identifiers (e.g., content, a face, a voice, and the like) and, upon confidence exceeding a threshold (e.g., as explained above), triggers enforcement actions (e.g., deleting manipulated content, marking content as manipulated, and the like).

Figure 7:
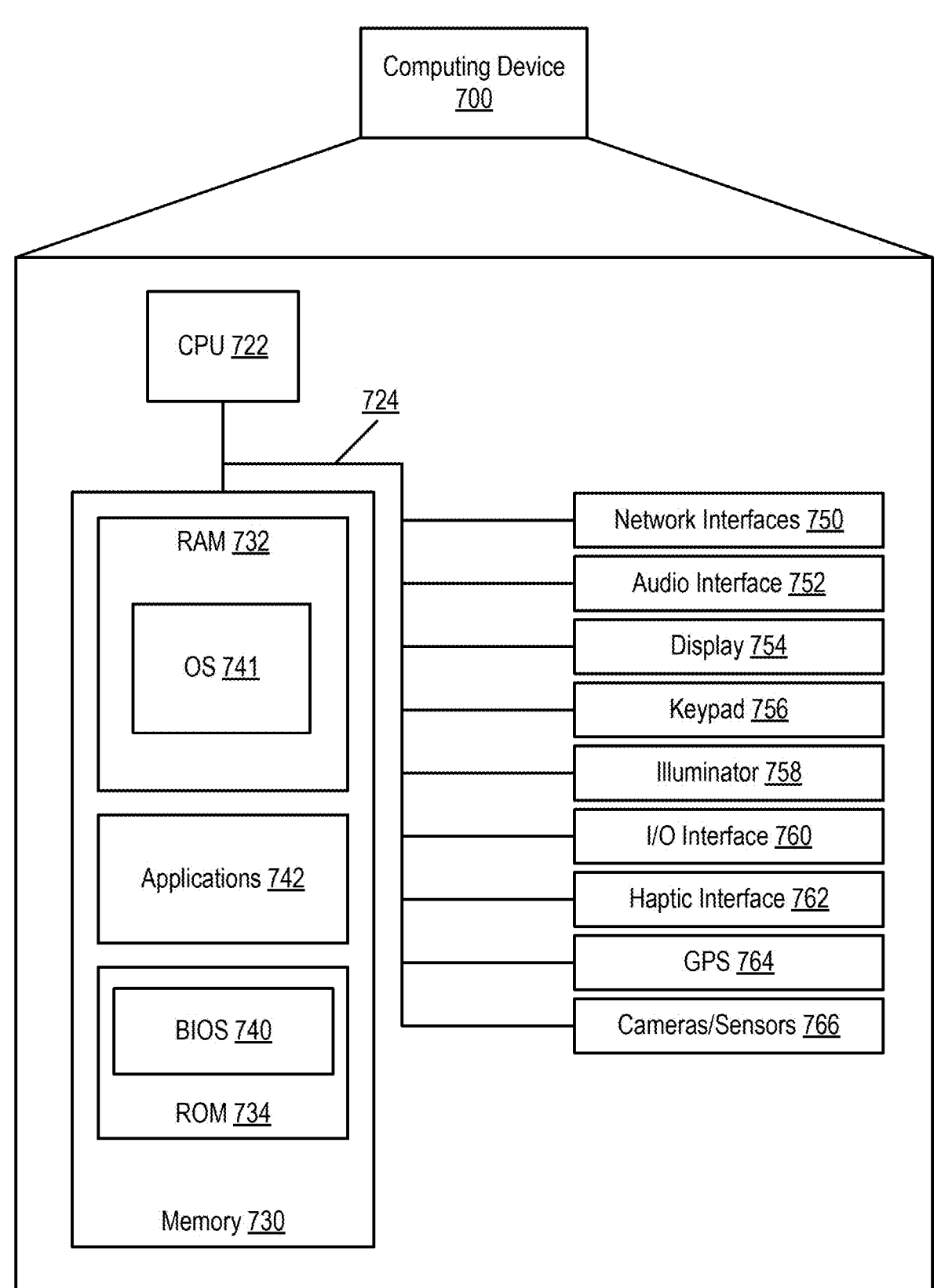
FIG. 7 is a block diagram illustrating a computing device showing an example of a client or server device used in some embodiments of the present disclosure.

FIG. 7 is a schematic diagram illustrating an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 and/or UE 112 discussed above at least in relation to FIG. 1.

As shown in the figure, in some embodiments, client device 700 includes a processing unit (CPU) 722 in communication with a mass memory 730 via a bus 724. Client device 700 also includes a power supply, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. The power supply provides power to client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of client device 700 on the surface of the Earth, which typically outputs a location as latitude and longitude values. GPS transceiver 764 can also employ other geo-positioning mechanisms, including, but not limited to, tri-angulation, assisted GPS (AGPS), E-OTD, CI, SAI, ETA, BSS or the like, to further determine the physical location of client device 700 on the surface of the Earth. In an embodiment, however, client device 700 may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of client device 700. The mass memory also stores an operating system 741 for controlling the operation of client device 700.

Memory 730 further includes one or more data stores, which can be utilized by client device 700 to store, among other things, applications 742 and/or other information or data. For example, data stores may be employed to store information that describes various capabilities of client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 700.

Applications 742 may include computer executable instructions which, when executed by client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In some embodiments, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber", "consumer", or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by an application, a digital asset comprising digital content data;
   extracting, by the application, physical properties of the digital content data;
   embedding, by the application, a digital fingerprint into transform coefficients of the digital content data such that the embedded digital fingerprint is bound to the physical properties;
   generating, by the application, an entanglement bit (ebit) based on the transform coefficients, the generation of the ebit comprising:

extracting, by the application, the transform coefficients of the digital content data subsequent to the embedding of the digital fingerprint, and
   generating, by the application, the ebit based on the extracted transform coefficients; and
   controlling, by the application, data transfer of the digital asset based on the ebit, such that the ebit manages read/write access of the digital asset.

2. The method of claim 1, wherein extracting the physical properties of the digital content data comprises identifying transform-domain features of the digital content data corresponding to Laplacian edges or eigenfunctions.

3. The method of claim 2, wherein embedding the digital fingerprint into the transform coefficients of the digital content data such that the embedded digital fingerprint is bound to the physical properties comprises embedding the digital fingerprint based on the identified transform-domain features.

4. The method of claim 1, further comprising introducing, by the application, controlled discontinuities at block or boundary locations of the digital content data to produce transform-domain Gibbs artifacts.

5. The method of claim 4, wherein the ebit comprises:
   embedding information associated with the embedded digital fingerprint; and
   pattern information associated with the controlled discontinuities.

6. The method of claim 5, further comprising authenticating the digital asset based on the ebit.

7. The method of claim 6, wherein authenticating the digital asset based on the ebit comprises determining whether a pattern of the controlled discontinuities matches an expected pattern included in the pattern information.

8. The method of claim 6, wherein authenticating the digital asset based on the ebit comprises:
   extracting the embedded digital fingerprint; and
   authenticating the digital asset based on a comparison of the extracted digital fingerprint and a reference digital fingerprint included in the embedding information.

9. A device comprising:
   a processor; and
   memory tangibly storing computer instructions that, when executed, cause the processor to:
      receive a digital asset comprising digital content data;
      extract physical properties of the digital content data;
      embed a digital fingerprint into transform coefficients of the digital content data such that the embedded digital fingerprint is bound to the physical properties;
      generate an entanglement bit (ebit) based on the transform coefficients, the generation of the ebit comprising:
         extracting the transform coefficients of the digital content data subsequent to the embedding of the digital fingerprint, and
         generating the ebit based on the extracted transform coefficients; and
      control data transfer of the digital asset based on the ebit, such that the ebit manages read/write access of the digital asset.

10. The device of claim 9, wherein extracting the physical properties of the digital content data comprises identifying transform-domain features of the digital content data corresponding to Laplacian edges or eigenfunctions.

11. The device of claim 10, wherein embedding the digital fingerprint into the transform coefficients of the digital content data such that the embedded digital fingerprint is bound to the physical properties comprises embedding the digital fingerprint based on the identified transform-domain features.

12. The device of claim 9, wherein the processor is further caused to introduce controlled discontinuities at block or boundary locations of the digital content data to produce transform-domain Gibbs artifacts.

13. The device of claim 12, wherein the ebit comprises:
embedding information associated with the embedded digital fingerprint; and
pattern information associated with the controlled discontinuities.

14. The device of claim 13, wherein the processor is further caused to authenticate the digital asset based on the ebit.

15. The device of claim 14, wherein authenticating the digital asset based on the ebit comprises determining whether a pattern of the controlled discontinuities matches an expected pattern included in the pattern information.

16. The device of claim 14, wherein authenticating the digital asset based on the ebit comprises:
extracting the embedded digital fingerprint; and
authenticating the digital asset based on a comparison of the extracted digital fingerprint and a reference digital fingerprint included in the embedding information.

17. A non-transitory computer-readable storage medium tangibly encoded with computer-executable instructions that, when executed by a processor, perform a method comprising:
receiving a digital asset comprising digital content data;
extracting physical properties of the digital content data;
embedding a digital fingerprint into transform coefficients of the digital content data such that the embedded digital fingerprint is bound to the physical properties;
generating an entanglement bit (ebit) based on the transform coefficients, the generation of the ebit comprising:
extracting the transform coefficients of the digital content data subsequent to the embedding of the digital fingerprint, and
generating the ebit based on the extracted transform coefficients; and
controlling data transfer of the digital asset based on the ebit, such that the ebit manages read/write access of the digital asset.

18. The non-transitory computer-readable storage medium of claim 17, further comprising introducing controlled discontinuities at block or boundary locations of the digital content data to produce transform-domain Gibbs artifacts.

* * * * *